(12) United States Patent
Ueki

(10) Patent No.: US 8,407,897 B2
(45) Date of Patent: Apr. 2, 2013

(54) METHOD OF MANUFACTURING A VIBRATION ISOLATOR

(75) Inventor: Akira Ueki, Kamakura (JP)

(73) Assignee: Bridgestone Corporation, Tokyo (JP)

( * ) Notice: Subject to any disclaimer, the term of this patent is extended or adjusted under 35 U.S.C. 154(b) by 185 days.

(21) Appl. No.: 13/123,379

(22) PCT Filed: Oct. 28, 2009

(86) PCT No.: PCT/JP2009/068521
§ 371 (c)(1),
(2), (4) Date: Apr. 8, 2011

(87) PCT Pub. No.: WO2010/050521
PCT Pub. Date: May 6, 2010

(65) Prior Publication Data
US 2011/0192030 A1 Aug. 11, 2011

(30) Foreign Application Priority Data
Oct. 28, 2008 (JP) .................................. 2008-276460

(51) Int. Cl.
*B21F 35/00* (2006.01)
(52) U.S. Cl. .................................. 29/896.93; 267/140.13
(58) Field of Classification Search .................. 29/897.2, 29/896.93; 267/140.13–140.15
See application file for complete search history.

(56) References Cited

U.S. PATENT DOCUMENTS 4,826,426 A * 5/1989 Nelson .......................... 431/100
4,889,325 A * 12/1989 Flower et al. ............. 267/140.13
4,997,168 A * 3/1991 Kato ........................ 267/140.13

(Continued)

FOREIGN PATENT DOCUMENTS

| CN | 1170101 A | 1/1998 |
|---|---|---|
| JP | 2860701 B2 | 2/1999 |
| JP | 2001-141193 A | 5/2001 |
| JP | 2004-286068 A | 10/2004 |
| JP | 2008-025740 A | 2/2008 |

OTHER PUBLICATIONS

International Search Report for PCT/JP2009/068521 dated Jan. 12, 2010.
Chinese Office Action dated Oct. 15, 2012 issued in Chinese Application No. 200980137938.5.

*Primary Examiner* — David Bryant
*Assistant Examiner* — Justin Sikorski
(74) *Attorney, Agent, or Firm* — Sughrue Mion, PLLC

(57) ABSTRACT

The present invention relates to a method of manufacturing a vibration isolator (10), wherein in a sealing step in which a liquid mixture is sealed inside the interior of a first mounting component (11) in a vibration isolator main body (21), after the internal pressure inside the first mounting component (11) has been changed to a negative pressure which is equal to or greater than the vapor pressure of a first liquid (L1) which has the lower vapor pressure from among the first liquid (L1) and a second liquid (L2), the first liquid (L1) is injected into the interior of the first mounting component (11) so as to raise the internal pressure thereof, and, thereafter, the second liquid (L2) is injected into the interior of the first mounting component (11). According to the present invention, when a liquid mixture which contains a plurality of types of liquid which each have mutually different vapor pressures is sealed inside the first mounting component, it is possible to accurately and with superior reproducibility seal desired quantities of each of the plurality of types of liquid and at the same time prevent air from being retained inside the first mounting component (11).

5 Claims, 2 Drawing Sheets

U.S. PATENT DOCUMENTS

| | | | |
|---|---|---|---|
| 5,180,148 A * | 1/1993 | Muramatsu | 267/140.14 |
| 5,240,233 A * | 8/1993 | Kato et al. | 267/140.13 |
| 5,628,498 A * | 5/1997 | Nanno | 267/140.13 |
| 5,639,073 A * | 6/1997 | Suzuki et al. | 267/140.13 |
| 6,916,016 B2 * | 7/2005 | Akasa | 267/140.13 |
| 2006/0125162 A1 * | 6/2006 | Tashiro | 267/140.14 |
| 2010/0270716 A1 * | 10/2010 | Ueki et al. | 267/140.13 |
| 2012/0139174 A1 * | 6/2012 | Matsumoto et al. | 267/140.13 |

* cited by examiner

METHOD OF MANUFACTURING A VIBRATION ISOLATOR

CROSS REFERENCE TO RELATED APPLICATION

This application is a National Stage of International Application No. PCT/JP2009/068521 filed Oct. 28, 2009, claiming priority based on Japanese Patent Application No. 2008-276460, filed Oct. 28, 2008, the contents of all of which are incorporated herein by reference in their entirety.

TECHNICAL FIELD

The present invention relates to a method of manufacturing a vibration isolator that is used, for example, in automobiles and industrial machinery and the like, and that absorbs and attenuates vibration in a vibration generating portion such as an engine. Priority is claimed on Japanese Patent Application No. 2008-276460, filed Oct. 28, 2008, the contents of which are incorporated herein by reference.

TECHNICAL BACKGROUND

As a conventional vibration isolator of this type a structure is known in which there are provided: a cylindrical first mounting component which is connected to either a vibration generating portion or a vibration receiving portion; a second mounting component which is connected to the other one of the vibration generating portion and the vibration receiving portion; a rubber elastic body which elastically connects together these two mounted components and closes off an aperture portion on one side in the axial direction of the first mounting component; a diaphragm which closes off an aperture portion on the other side in the axial direction of the first mounting component; and a partitioning component which partitions the interior of the first mounting component into a primary liquid chamber in which the rubber elastic body forms a portion of the partition wall, and a secondary liquid chamber in which the diaphragm forms a portion of the partition wall, wherein an orifice passage which enables the primary liquid chamber to communicate with the secondary liquid chamber is formed between an outer circumferential surface side of the partitioning component and an inner circumferential surface side of the first mounting component.

In recent years, as is shown, for example, in Patent document 1 (see below), a vibration isolator has been proposed in which a liquid mixture which contains a plurality of types of liquid is sealed inside the first mounting component.

The following method may be considered as the method used to manufacture this type of vibration isolator. Firstly, a main body rubber component in which the first mounting component and the second mounting component are connected together by means of the rubber elastic body is formed. Next, the partitioning component and the diaphragm are fitted to this main body rubber component, and the interior of the first mounting component is partitioned into the primary liquid chamber and the secondary liquid chamber and is tightly sealed. Air is then expelled from the interior of the first mounting component so as to place it under negative pressure, and the liquid mixture is injected into the interior of the first mounting component by the suction force created by this negative pressure thereby forming a vibration isolator.

DOCUMENTS OF THE PRIOR ART

Patent Documents

[Patent document 1] Japanese Patent Publication No. 2860701

DISCLOSURE OF THE INVENTION

Problems to be Solved by the Invention

However, in the above described conventional method of manufacturing a vibration isolator, when the vapor pressures of the plurality of types of liquid are mutually different from each other, when the liquid mixture is injected inside the first mounting component which is under negative pressure, there is a possibility that at least the liquid which has the highest vapor pressure from among the plurality of types of liquid will become vaporized. If such vaporization occurs, then not only does it become difficult to accurately inject the plurality of types of liquid in their desired respective quantities, but also air (i.e. gas) remains within the liquid mixture inside the first mounting component.

This invention was conceived in view of the above described circumstances and it is an object thereof to provide a method of manufacturing a vibration isolator that, when a liquid mixture which contains a plurality of types of liquid which each have mutually different vapor pressures is sealed inside a first mounting component, makes it possible to accurately and with superior reproducibility seal the desired quantities of each of the plurality of types of liquid while also preventing air from being retained inside the first mounting component.

Means for Solving the Problem

In order to solve the above described problems and achieve the aforementioned object, the present invention is a method of manufacturing a vibration isolator which is provided with: a cylindrical first mounting component which is connected to either one of a vibration generating portion or a vibration receiving portion; a second mounting component which is connected to the other one of the vibration generating portion or the vibration receiving portion; a rubber elastic body which elastically connects together these two mounted components; and a partitioning component which partitions the interior of the first mounting component into a primary liquid chamber in which the rubber elastic body forms a portion of the partition wall thereof and whose internal volume is changed by the deformation of the rubber elastic body, and a secondary liquid chamber in which at least a portion of the partition wall thereof is formed such that it is able to be deformed, wherein an orifice passage which enables the primary liquid chamber to communicate with the secondary liquid chamber is formed between an outer circumferential surface side of the partitioning component and an inner circumferential surface side of the first mounting component, and a liquid mixture which contains at least a first liquid and a second liquid which each have mutually different vapor pressures is sealed inside the first mounting component, the method of manufacturing the vibration isolator comprising: a main body rubber component formation step in which a main body rubber component which is created when the two mounting components are joined together by means of the rubber elastic body is formed;

a vibration isolator main body formation step in which a vibration isolator main body is formed by attaching at least the partitioning component to the main body rubber component such that the interior of the first mounting component is tightly sealed and is divided into the primary chamber and the secondary chamber; and a sealing step in which a vibration isolator is formed by sealing the liquid mixture inside the interior of the first mounting component in the vibration isolator main body, wherein, in the sealing step, after the internal pressure inside the first mounting component has been changed to a negative pressure which is equal to or greater than the vapor pressure of the first liquid which has the lower vapor pressure from among the first liquid and the second liquid, the first liquid is injected into the interior of the first mounting component so as to raise the internal pressure thereof, and, thereafter, the second liquid is injected into the interior of the first mounting component.

In the present invention, during the sealing step, because the first liquid is injected into the interior of the first mounting component after the internal pressure inside the first mounting component has been set to a negative pressure that is not less than the vapor pressure of the first liquid, which has the lower vapor pressure from among the first liquid and the second liquid, it is possible to prevent the first liquid being vaporized during this injection.

In addition, because rarefied air remaining inside the first mounting component is compressed by the injection of the first liquid so that there is a rise in the internal pressure inside the first mounting component, when the second liquid which has the higher vapor pressure from among the first liquid and the second liquid is subsequently injected inside the first mounting component, it is possible to suppress the vaporization of the second liquid.

Note that if the first liquid and the second liquid are, for example, not mutually soluble, and it is difficult to uniformly disperse these two liquids and, then if the two liquids and are combined and injected directly into the interior of the first mounting component as the liquid mixture, then it is thought that it may be difficult to accurately inject the first liquid and the second liquid in their desired respective quantities with superior reproducibility. However, as in the present embodiment, if the second liquid is injected after the first liquid has been injected, as is described above, coupled with the fact that it is possible to suppress vaporization of the second liquid, it is also possible to prevent such problems.

As a result of the above, when a liquid mixture which contains a plurality of types of liquid that each have mutually different vapor pressures is being sealed inside the first mounting component, it possible to accurately and with superior reproducibility seal the plurality of types of liquid in the desired quantities of each while also preventing air from being retained.

Note that the internal pressure inside the first mounting component when the first liquid is being injected may be, for example, approximately 2 to 3 times higher than the vapor pressure of the first liquid.

In this case, it is possible to reliably prevent the first liquid becoming vaporized when it is being injected.

Here, in the sealing step, it is possible for the first liquid to be injected into the interior of the first mounting component until the internal pressure inside the first mounting component becomes a negative pressure that is equal to or more than the vapor pressure of the second liquid.

In this case, because the first liquid is injected into the interior of the first mounting component until the internal pressure inside the first mounting component becomes a negative pressure that is equal to or more than the vapor pressure of the second liquid, when the second liquid is subsequently being injected it is possible to reliably prevent this second liquid becoming vaporized.

Moreover, in the sealing step, it is also possible for a greater quantity of the first liquid than of the second liquid to be injected into the interior of the first mounting component.

Furthermore, in the sealing step, it is also possible for between not less than 60% by weight and not more than 99.9% by weight of the first liquid to be injected into the first mounting component, and for between not less than 0.1% by weight and not more than 40% by weight of the second liquid to be injected into the first mounting component.

In this case, because the injection quantity of the first liquid is greater than that of the second liquid, when the first liquid is being injected into the interior of the first mounting component, it is possible to make it easy for the internal pressure inside the first mounting component to be sufficiently raised to at least a level where it is difficult for the second liquid L2 to be vaporized, so that it is possible to reliably achieve the above described operation and effect.

Moreover, it is also possible for the first liquid to either contain ethylene glycol and propylene glycol, or to be solely ethylene glycol, and for the second liquid to be silicone oil, fluorine oil, or water.

In this case, it is possible to reliably achieve the above described operation and effect.

Effects of the Invention

According to this invention, when a liquid mixture which contains a plurality of types of liquid which each have mutually different vapor pressures is being sealed inside a first mounting component, it is possible to accurately and with superior reproducibility seal the desired quantities of each of the plurality of types of liquid and at the same time prevent air from being retained inside the first mounting component.

BEST EMBODIMENTS FOR IMPLEMENTING THE INVENTION

Figure 1:
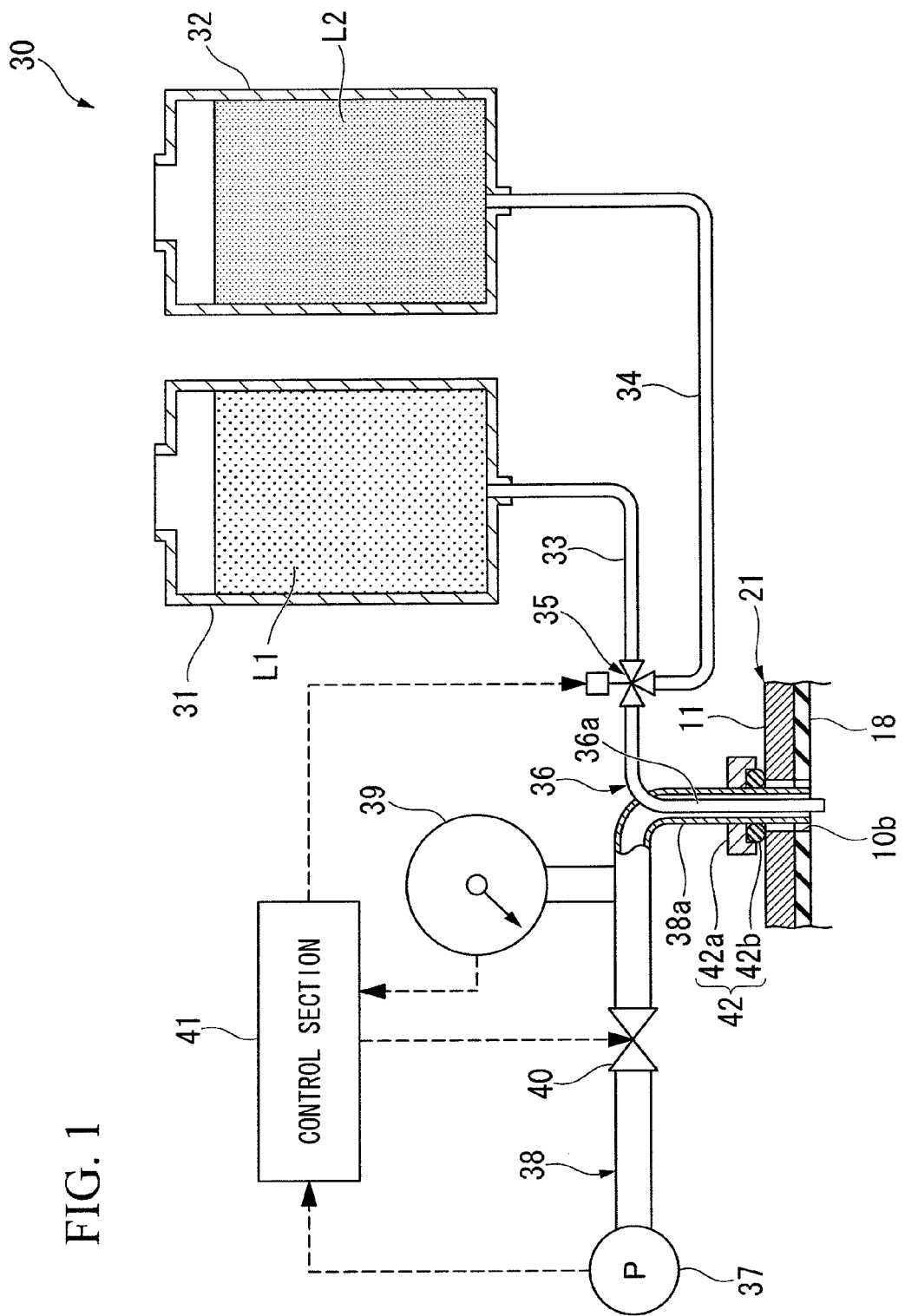
FIG. 1 is a schematic view showing a sealing apparatus which is used to implement the method of manufacturing a vibration isolator which is described as an embodiment of the present invention.

Hereinafter, an embodiment of the vibration isolator of the present invention will be described with reference made to FIG. 1 and FIG. 2. As is shown in FIG. 2, this vibration isolator 10 is provided with a cylindrical first mounting component 11 which is connected to either a vibration generating portion or a vibration receiving portion; a second mounting component 12 which is connected to the other of the vibration generating portion and the vibration receiving portion; a rubber elastic body 13 which elastically connects together these two mounted components 11 and 12; and a partitioning component 16 which partitions the interior of the first mounting component 11 into a primary liquid chamber 14 and a secondary liquid chamber 15 (described below).

Note that each of these components is formed in a circular shape or a toroidal shape when seen in plan view, and are positioned coaxially on a common axis. Hereinafter, this common axis is referred to as the center axis O.

In addition, when this vibration isolator 10 is installed, for example, in an automobile, while the second mounting component 12 is connected to the engine which serves as a vibration generating portion, the first mounting component 11 is connected to the vehicle body which serves as a vibration receiving portion via a bracket or the like (not shown). As a result, it is possible to suppress vibration from the engine being transmitted to the vehicle body.

The second mounting component 12 is formed in a columnar shape, and is positioned at an aperture portion at one end in the direction of the center axis O of the first mounting component 11. The rubber elastic body 13 is adhered to an aperture portion at one end of the first mounting component 11 and to an outer circumferential surface of the second mounting component 12, and closes off the interior of the first mounting component 11 from one end side in the direction of the center axis O. Note that a female threaded portion is formed on one end surface of the second mounting component 12. Moreover, one end portion in the axial direction of the second mounting component 12 protrudes outwards in the direction of the center axis O past the aperture surface at one end in the direction of the center axis O of the first mounting component 11. Furthermore, the portion of the first mounting component 11 where the other end in the direction of the center axis O of the rubber elastic body 13 is positioned forms a toroidal groove portion 11a which extends continuously around the entire circumference. Note that in the toroidal grove portion 11a, the inner circumferential surface of the first mounting component 11 is formed in a protruding shape which protrudes inwards in a radial direction, and the outer circumferential surface of the first mounting component 11 is formed in a trench shape which protrudes inwards in the radial direction.

A diaphragm 19 is placed at an aperture portion at the other end in the direction of the center axis O of the first mounting component 11. This diaphragm 19 is formed in a circular shape when seen in plan view, and is provided with an inverted bowl-shaped diaphragm rubber 19b which is open towards the other end side in the direction of the center axis O, and with a ring plate 19a to whose inner circumferential surface the outer circumferential edge portion of the diaphragm rubber 19b is adhered by vulcanization around the entire circumference thereof. If this ring plate 19a is engaged with the inside of the aperture portion at the other end of the first mounting component 11, the diaphragm rubber 19b closes off the interior of the first mounting component 11 from the other end side in the direction of the center axis O.

In the above described structure, portions of the interior of the first mounting component 11 that are located between the diaphragm rubber 19b and the rubber elastic body 13 are closed liquid-tight by the diaphragm rubber 19b and the rubber elastic body 13, and form a liquid chamber which is filled with a liquid mixture L (described below). This liquid chamber is partitioned by the partitioning component 16 into a primary liquid chamber 14 in which the rubber elastic body 13 forms a portion of the partition wall thereof and whose internal volume is changed by the deformation of this rubber elastic body 13, and a secondary liquid chamber 15 in which the diaphragm rubber 19b forms a portion of the partition wall thereof and whose internal volume is changed by the deformation of this diaphragm rubber 19b.

An orifice passage 24 which extends in the circumferential direction of the first mounting component 11 is formed between the outer circumferential surface side of the partitioning component 16 and the inner circumferential surface side of the first mounting component 11.

In the example shown in the drawings, the partitioning component 16 is provided with a partitioning component main body 16b which is formed in a toroidal shape, and with a membrane 16a which is formed from a rubber material in a circular plate shape and whose outer circumferential edge portion is adhered by vulcanization to the inner circumferential surface of the partitioning component main body 16b around the entire circumference thereof. A circumferential groove is formed in the outer circumferential surface of the partitioning component main body 16b, and this circumferential groove forms the orifice passage 24. This orifice passage 24 is closed off by a rubber membrane 18 which is coated onto the inner circumferential surface of the first mounting component 11 from the outer side in the radial direction of the partitioning component main body 16b.

Note that the rubber membrane 18 is formed integrally with the rubber elastic body 13. The entire inner circumferential surface of the first mounting component 11 is covered by the rubber elastic body 13 and the rubber membrane 18. The partitioning component 16 is fixed in position as a result of outer circumferential edge portions of the partitioning component main body 16b being held in the direction of the center axis O by the toroidal groove portion 11a of the first mounting component 11 and the ring plate 19a of the diaphragm 19. Furthermore, the vibration isolator 10 is a compression type of vibration isolator which is mounted such that the primary liquid chamber 14 is positioned on the upper side in a vertical direction and such that the auxiliary chamber 15 is positioned on the lower side in the vertical direction. A through hole 10b which penetrates the first mounting component 11 and the rubber membrane 18 and which opens onto the orifice passage 24 is formed in the vibration isolator 10, and a rivet 10a is fastened in this through hole 10b.

In addition, in the present embodiment, the liquid mixture L contains at least a first liquid L1 and a second liquid L2 which have mutually different vapor pressures. The first liquid L1 has a lower vapor pressure than the second liquid L2, and a greater quantity by weight of the first liquid L1 is contained in the liquid mixture L. Note that the second liquid L2 has a higher vapor pressure than the first liquid L1 within a temperature range of at least −30° C. through 100° C. For example, the vapor pressure of the second liquid L2 may be two or more times the vapor pressure of the first liquid L1.

Examples of the first liquid L1 described above include liquids containing ethylene glycol and propylene glycol, as well as simple ethylene glycol. Examples of the second liquid L2 include silicone oil, fluorine oil, and water. In the liquid mixture L the content of the first liquid L1 may be between not less than 60% by weight and not more than 99.9% by weight, and the content of the second liquid L2 may be between not less than 0.1% by weight and not more than 40% by weight. Preferably, the liquid mixture L contains between not less than 80% by weight and not more than 99% by weight of the first liquid L1, and between not less than 1% by weight and not more than 20% by weight of the second mixture L2. Note that the second liquid L2 has a lower viscosity than the first liquid L1. Moreover, for example, 80 cc through 200 cc of the first liquid L1 may be contained in the liquid mixture L, and 0.5 cc through 5 cc of the second liquid L2 may be contained therein.

Note that in the liquid mixture L, even if the first liquid L1 and the second liquid L2 are not mutually soluble, if a large vibration (i.e., load) is input into at least this vibration isolator 10 because of, for example, unevenness in a road surface or the like, the second liquid L2 becomes dispersed in a number of places in the first liquid L1 while remaining separate from the first liquid L1.

Next, a method of manufacturing the vibration isolator 10 which is constructed in the manner described above will be described.

Firstly, a main body rubber component forming step is performed in which a main body rubber component 17 which is created by joining together the first mounting component 11 and the second mounting component 12 by means of the rubber elastic body 13 is formed.

The main body rubber component forming step will now be described in detail. Firstly, chemical treatment and adhesive coating is performed on both the inner circumferential surface of the first mounting component 11 and the outer circumferential surface of the second mounting component 12. These two mounting components 11 and 12 are then both placed inside a metal mold (not shown). Next, unvulcanized rubber is injected into this metal mold so as to form a part of the rubber elastic body 13 and a part of the rubber membrane 18 as a single body. These are then heated and vulcanized so as to form the rubber elastic body 13 and the rubber membrane 18 as a single body. At this time, the rubber elastic body 13 is adhered to the inner circumferential surface of the first mounting component 11 and the outer circumferential surface of the second mounting component 12, and the rubber membrane 18 is adhered to the inner circumferential surface of the first mounting component 11 so that a main body rubber component 20 is formed. In addition, the through hole 10b is provided penetrating the first mounting component 11 and the rubber membrane 18.

A partitioning component forming step is also performed in which the partitioning component 16, which has the membrane 16a provided on the inner side of the toroidal partitioning component main body 16b, is formed.

The partitioning component forming step will now be described in more detail. After chemical treatment and adhesive coating has been performed on the inner circumferential surface of the partitioning component main body 16b, this partitioning component main body 16b is placed inside a metal mold (not shown) which is used to form the membrane 16a. Next, unvulcanized rubber is injected into this metal mold so as to form a part of the membrane 16a. This is then heated and vulcanized so as to form the membrane 16a. At this time, outer circumferential edge portions of the membrane 16a are adhered to the inner circumferential surface of the partitioning component main body 16b so that the partitioning component 16 is formed.

A diaphragm forming step is also performed in which the diaphragm 19, which has the diaphragm rubber 19b provided on the inner side of the ring plate 19a, is formed.

The diaphragm forming step will now be described in more detail. After chemical treatment and adhesive coating has been performed on the inner circumferential surface of the ring plate 19a, this ring plate 19a is placed inside a metal mold (not shown) which is used to form the diaphragm rubber 19b. Next, unvulcanized rubber is injected into this metal mold so as to form a part of the diaphragm rubber 19b. This is then heated and vulcanized so as to form the diaphragm rubber 19b. At this time, outer circumferential edge portions of the diaphragm rubber 19b are adhered to the inner circumferential surface of the ring plate 19a so that the diaphragm 19 is formed.

Next, a vibration isolator main body forming step is performed in which a vibration isolator main body 21 is formed by attaching the partitioning component 16 and the diaphragm 19 to the main body rubber component 17.

The vibration isolator main body forming step will now be described in more detail. Firstly, the partitioning component main body 16b of the partitioning component 16 is fitted inside the first mounting component 11 of the main body rubber component 17, so that the partitioning component 16 is attached to the main body rubber component 17. By doing this, the interior of the first mounting component 11 is partitioned into the primary liquid chamber 14 and the secondary liquid chamber 15. At this time, the partitioning component 16 is provided inside the first mounting component 11 at a position where the through hole 10b which penetrates the first mounting component 11 and the rubber membrane 18 opens onto the orifice passage 24 of the partitioning component main body 16b.

Next, after the ring plate 19a of the diaphragm 19 has been fitted inside the aperture portion at the other end of the first mounting component 11 of the main body rubber component 17, by then bending the entire circumference of the end portion on the other end side of the first mounting component 11 inwards in a radial direction, the diaphragm 19 is attached to the main body rubber component 17. At this time, the partitioning component main body 16b of the partitioning component 16 is held in the direction of the center axis O by the toroidal groove portion 11a of the first mounting component 11 and the ring plate 19a of the diaphragm 19.

By performing the above step, the vibration isolator main body 21 which has not yet had the liquid mixture L sealed inside the first mounting component 11 is formed.

Next, a sealing step is performed in which the liquid mixture L is sealed inside the first mounting component 11 in the vibration isolator main body 21.

Firstly, a sealing apparatus 30 which is used in this sealing step will be described.

Figure 2:
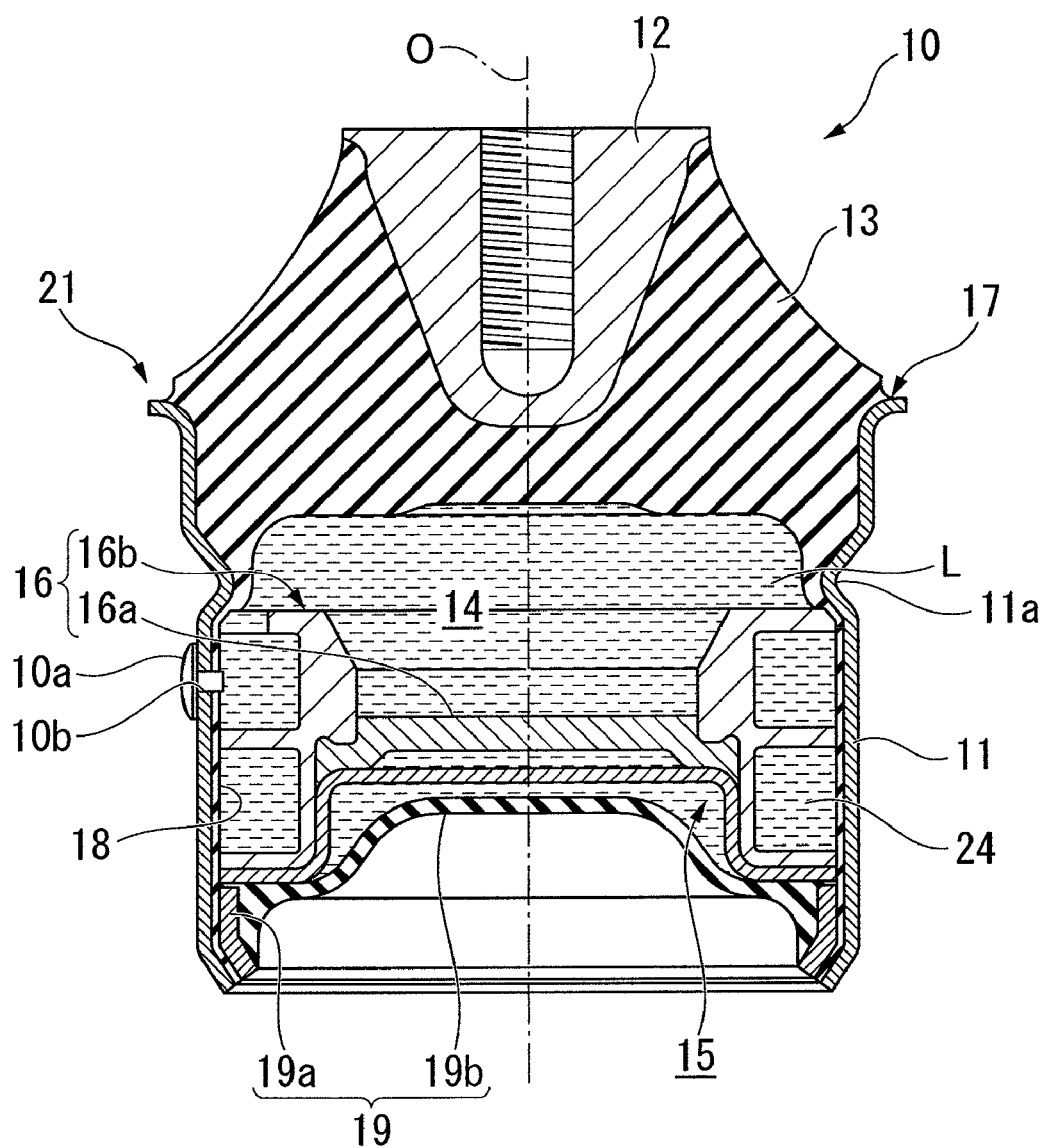
FIG. 2 is a vertical cross-sectional view of a vibration isolator which is described as an embodiment of the present invention.

As is shown in FIG. 1, this sealing apparatus 30 is provided with a first tank 31 which is filled with the first liquid L1, a second tank 32 which is filled with the second liquid L2, a first liquid supply pipe 33 which is connected to the first tank 31 and communicates with the interior of this tank 31, a second liquid supply pipe 34 which is connected to the second tank 32 and communicates with the interior of this tank 32, a three-way valve 35 to which the two liquid supply pipes 33 and 34 are connected, a common liquid supply pipe 36 which is connected to the three-way valve 35 and whose distal end side forms an injection nozzle 36a, a vacuum pump 37, an air intake pipe 38 which is connected to the vacuum pump 37 and whose distal end side forms an intake nozzle 38a, an air intake valve 40 which is provided at a position partway along the air intake pipe 38, a pressure meter 39 which is provided in the air intake pipe 38 opposite the vacuum pump 37 side so that they sandwich the air intake valve 40, a sealing component 42 which is provided on the outer circumferential side of the intake nozzle 38a, and a control section 41 that operates the three-way valve 35 and the air intake valve 40 individually based on respective output signals from the vacuum pump 37 and the pressure meter 39.

The injection nozzle 36a of the common liquid supply pipe 36 is provided inside the intake nozzle 38a of the air intake pipe 38.

The sealing component 42 is provided with a pedestal 42a which is formed in a ring shape and has a hollow portion provided in the center portion thereof, and an O-ring 42b which is seated inside the hollow portion in the pedestal 42a. The injection nozzle 36a and the intake nozzle 38a penetrate through the pedestal 42a and the O-ring 42b.

Note that the inner diameter of the through hole 10b which is formed in the vibration isolator main body 21 is larger than the inner diameter of the O-ring 42b and smaller than the outer diameter of the O-ring. Because of this, when the intake nozzle 38a and the injection nozzle 36a are inserted through the through hole 10b in the vibration isolator main body 21, this through hole 10b is tightly sealed by the sealing component 42.

Next, a sealing step in which the sealing apparatus 30 constructed in the manner described above is used will be described.

Firstly, after the intake nozzle 38a and the injection nozzle 36a have been inserted through the through hole 10b in the vibration isolator main body 21, and the through hole 10b has been tightly sealed by the sealing component 42, the vacuum pump 37 is driven. At this time, a signal is output from the vacuum pump 37 to the control section 41, and the control section 41 which receives this output signal outputs a control signal to the air intake valve 40 thereby causing this valve 40 to open. As a result of this, air inside the first mounting component 11 and the vibration isolator main body 21, namely, inside the primary liquid chamber 14 and secondary liquid chamber 15 (including the orifice passage 24: the same applies below) is expelled through the through hole 10b from the intake nozzle 38a of the air intake pipe 38, so that the internal pressures inside these two liquid chambers 14 and 15 change to a pressure which is lower than atmospheric pressure (101325 Pa), namely, change to a negative pressure.

When it has been confirmed by the pressure meter 39 that the internal pressure inside the two liquid chambers 14 and 15 has changed to a negative pressure value which has been set in advance and is not less than the vapor pressure of the first liquid L1, which has the lower vapor pressure from among the aforementioned first liquid L1 and second liquid L2, and is preferably, for example, two to three times higher than the vapor pressure of the first liquid L1, a signal is output from this pressure meter 39 to the control section 41, and the control section 41 which receives this output signal outputs a control signal to the air intake valve 40 and the three-way valve 35 so that, while the air intake pipe 38, second tank 32, and second liquid supply pipe 34 are shut off from the common liquid supply pipe 36, there is mutual communication between the first tank 31, the first liquid supply pipe 33, and the common liquid supply pipe 36, and the operation of an internal timer is started.

At this time, suction force caused by the negative pressure in the two liquid chambers 14 and 15 and applied pressure caused by the hydraulic pressure generated by the weight of the first liquid L1 inside the first tank 31 are applied to the first liquid L1 inside the first tank 31 and the first liquid supply pipe 33. As a result, the first liquid L1 inside the first tank 31 and the first liquid supply pipe 33 is injected into the interiors of the two liquid chambers 14 and 15 from the through hole 10b through the injection nozzle 36a of the common liquid supply pipe 36.

At this time, any rarefied air remaining in the two liquid chambers 14 and 15 is compressed by the injected first liquid L1 so that there is a rise in the internal pressure inside the two liquid chambers 14 and 15.

When the timer of the control section 41 has counted a predetermined length of time, namely, when a desired quantity of the first liquid L1 has been injected into the two liquid chambers 14 and 15, in the present embodiment, when the internal pressure inside the two liquid chambers 14 and 15 has changed to a negative pressure which is not less than the vapor pressure of the second liquid L2, a control signal is output from the control section 41 to the three-way valve 35. This control signal causes the communication between the first tank 31 and first liquid supply pipe 33 and the common liquid supply pipe 36 to be interrupted, and causes communication between the second tank 32 and second liquid supply pipe 34 and the common liquid supply pipe 36 to be established, and a new operation of the timer is also started. At this time, in the same way as is described above, suction force and applied pressure are applied to the second liquid L2 inside the second tank 32 and the second liquid supply pipe 34, and this liquid L2 is injected into the interior of the two liquid chambers 14 and 15 from the through hole 10b through the injection nozzle 36a of the common liquid supply pipe 36.

When the timer of the control section 41 has counted a predetermined length of time, namely, when a desired quantity of the second liquid L2 has been injected into the two liquid chambers 14 and 15 and the two liquid chambers 14 and 15 are filled with the first liquid L1 and the second liquid L2, a control signal is output from the control section 41 to the three-way valve 35 and this control signal causes a continuance of the interrupted communication between the first tank 31 and first liquid supply pipe 33 and the common liquid supply pipe 36, and causes communication between the second tank 32 and second liquid supply pipe 34 and the common liquid supply pipe 36 to also be interrupted, and thereby causes the injection of the first liquid L1 and the second liquid L2 into the two liquid chambers 14 and 15 to be stopped.

Thereafter, the intake nozzle 38a and the injection nozzle 36a are withdrawn from the through hole 10b, and the rivet 10a is fastened into the through hole 10b. As a result, the two liquid chambers 14 and 15 are sealed shut and the vibration isolator 10 is formed.

Here, examples will now be described in which the internal pressure inside the first mounting component 11 in the vibration isolator main body 21 is calculated after the first liquid L1 has been injected into the two liquid chambers 14 and 15, but before the second liquid L2 is injected therein.

For this calculation, air is expelled from the two liquid chambers 14 and 15 before the first liquid L1 is injected therein so that the internal pressure thereof is set at 40 Pa, and the internal volume of these two liquid chambers 14 and 15 are set at 100 cc, and it is also assumed that the internal pressure inside these two liquid chambers 14 and 15 will be at atmospheric pressure when the injection of the two liquids L1 and L2 is ended, and it is further assumed that the residual air in the two liquid chambers 14 and 15 before and after the injection of the first liquid L1 will experience a constant enthalpy process ($P \times V^\kappa$=constant (wherein P is the pressure, V is the volume, and $\kappa$ is the specific heat ratio and in the case of a diatomic molecule is 1.4)).

FIRST EXAMPLE

Firstly, an example is described in which ethylene glycol (having a vapor pressure of 8 Pa (at 25° C.)) is used for the first liquid L1, and silicone oil (having a vapor pressure of 35 Pa (at 25° C.)) is used for the second liquid L2, and 90 cc of the first liquid L1 and 10 cc of the second liquid L2 are injected respectively into the two liquid chambers 14 and 15.

When the 90 cc of the first liquid L1 is injected into the two liquid chambers 14 and 15, because the residual air inside the two liquid chambers 14 and 15 is compressed from 100 cc to 10 cc, a state in which $40 \times (100 \times 10^{-6})^{1.4} = P \times (10 \times 10^{-6})^{1.4}$ is established. As a result, the internal pressure P inside the two liquid chambers 14 and 15 after the first liquid L1 has been injected therein but before the second liquid L2 is injected rises from 40 Pa to 1004.75 Pa, and is higher than the vapor pressure of 35 Pa of the second liquid L2. Because of this, even if the second liquid L2 is injected into the two liquid chambers 14 and 15, there is no vaporization of this second liquid L2.

Note that because the ethylene glycol fanning the first liquid L1 and the silicone oil forming the second liquid L2 are not mutually soluble, the pressure when the liquid mixture L formed by the two liquids L1 and L2 is vaporized, namely, the vapor pressure is not more than 8+35=43 pa. Accordingly, because this liquid mixture L is vaporized when it is injected into the two liquid chambers 14 and 15 whose internal pressure is at 40 Pa, air retention may occur in the two liquid chambers 14 and 15, and there may be cases in which the first liquid L1 and the second liquid L2 cannot be sealed to their desired respective quantities with a high degree of accuracy.

SECOND EXAMPLE

Next, an example is described in which ethylene glycol (having a vapor pressure of 8 Pa (at 25° C.)) is used for the first liquid L1, and pure water (having a vapor pressure of 3166 Pa (at 25° C.)) is used for the second liquid L2, and 96 cc of the first liquid L1 and 4 cc of the second liquid L2 are injected respectively into the two liquid chambers 14 and 15.

When the 96 cc of the first liquid L1 is injected into the two liquid chambers 14 and 15, because the residual air inside the two liquid chambers 14 and 15 is compressed from 100 cc to 4 cc, a state in which $40 \times (100 \times 10^{-6})^{1.4} = P \times (4 \times 10^{-6})^{1.4}$ is established. As a result, the internal pressure P inside the two liquid chambers 14 and 15 after the first liquid L1 has been injected therein but before the second liquid L2 is injected rises from 40 Pa to 3623.9 Pa, and is higher than the vapor pressure of 3166 Pa of the second liquid L2. Because of this, even if the second liquid L2 is injected into the two liquid chambers 14 and 15, there is no vaporization of this second liquid L2.

Note that because the ethylene glycol forming the first liquid L1 and the pure water forming the second liquid L2 are mutually soluble, as the mole number of the first liquid L1 is 1.727 mol and the mole number of the second liquid L2 is 0.222 mol, the vapor pressure of the liquid mixture L formed by the two liquids L1 and L2 is 368 Pa. Accordingly, because this liquid mixture L is vaporized when it is injected into the two liquid chambers 14 and 15 whose internal pressure is at 40 Pa, air retention may occur in the two liquid chambers 14 and 15, and there may be cases in which the first liquid L1 and the second liquid L2 cannot be sealed to their desired respective quantities with a high degree of accuracy.

As has been described above, according to the vibration isolator 10 of the present embodiment, during the sealing step, because the first liquid L1 is injected into the interior of the first mounting component 11 after the internal pressure inside the first mounting component 11 has been changed to a negative pressure which is not less than the vapor pressure of the first liquid L1, which is the lower vapor pressure from among the first liquid L1 and the second liquid L2, it is possible to prevent the first liquid L1 being vaporized during this injection.

In addition, because rarefied air remaining inside the first mounting component 11 is compressed by the injection of the first liquid L1 so that there is a rise in the internal pressure inside the first mounting component L1, when the second liquid L2 which has the higher vapor pressure from among the first liquid L1 and the second liquid L2 is subsequently injected inside the first mounting component 11, it is possible to repress the vaporization of the second liquid L2.

Here, if the first liquid L1 and the second liquid L2 are, for example, not mutually soluble, and it is difficult to uniformly disperse these two liquids L1 and L2, then if the two liquids L1 and L2 are combined and injected directly into the interior of the first mounting component 11 as the liquid mixture L, then it is thought that it may be difficult to inject the first liquid L1 and the second liquid L2 in their desired respective quantities with a high degree of accuracy and with superior reproducibility. However, as in the present embodiment, if the second liquid L2 is injected after the first liquid L1 has been injected, as is described above, coupled with the fact that it is possible to suppress vaporization of the second liquid L2, it is also possible to prevent problems such as those described above that occur when the two liquids are mutually insoluble.

As a result of the above, when the liquid mixture L which contains a plurality of types of liquid that each have mutually different vapor pressures is being sealed inside the first mounting component 11, it is possible to accurately and with superior reproducibility seal the plurality of types of liquid in the desired quantities of each while also preventing air from being retained.

Moreover, in the present embodiment, because the internal pressure inside the first mounting component 11 when the first liquid L1 is being injected is approximately 2 to 3 times higher than the vapor pressure of the first liquid L1, it is possible to reliably prevent the first liquid L1 becoming vaporized when it is being injected.

Furthermore, because the first liquid L1 is injected into the interior of the first mounting component 11 until the internal pressure inside the first mounting component 11 becomes a negative pressure that is equal to or more than the vapor pressure of the second liquid L2, when the second liquid L2 is subsequently being injected it is possible to reliably prevent it becoming vaporized.

Moreover, because the injection quantity of the first liquid L1 is greater than that of the second liquid L2, when the first liquid L1 is being injected into the interior of the first mounting component 11, it is possible to make it easy for the internal pressure inside the first mounting component 11 to be sufficiently raised to at least a level where it is difficult for the second liquid L2 to be vaporized.

Furthermore, in the present embodiment, because the injection quantities of the first liquid L1 and the second liquid L2 are set as the numerical range, and the respective materials of the first liquid L1 and the second liquid L2 are the above described materials, it is possible to reliably achieve the above described operation and effect.

Note that the range of technology of the present invention is not limited to the above described embodiment, and various modifications and the like may be made insofar as they do not depart from the scope of the present invention.

For example, the first liquid L1 and the second liquid L2 are not limited to those described above, and may be altered where this is appropriate.

Moreover, a compression type of apparatus has been used to illustrate the vibration isolator 10, however, the present invention may also be applied to a suspension type vibration isolator which is mounted such that the primary liquid chamber 14 is located on the lower side in a vertical direction and the secondary auxiliary chamber 15 is located on the upper side in the vertical direction.

Furthermore, the liquid mixture L is not limited to the two types of liquids L1 and L2, and may contain three or more types of liquid.

It is also possible for a surfactant such as, for example, an emulsifier to be mixed into the liquid mixture L.

Furthermore, in the above described embodiment, during the sealing step the first liquid L1 is injected into the interior of the first mounting component 11 until the internal pressure inside the first mounting component 11 becomes a negative pressure that is equal to or more than the vapor pressure of the second liquid L2, however, the present invention is not limited to this and it is also possible to lower the internal pressure inside the first mounting component 11 to less than the vapor pressure of the second liquid L2 after the first liquid L1 has been injected therein, or to raise it to a positive pressure which is higher than the vapor pressure of the second liquid L2.

In the present embodiment, during the sealing step a greater quantity of the first liquid L1 than of the second liquid L2 is injected into the interior of the first mounting component 11, however, it is also possible to inject the same quantity of the first liquid L1 as the second liquid L2, or a lesser quantity of the first liquid L1 than of the second liquid L2.

Furthermore, the sealing apparatus 30 that performs the sealing step is not limited to that of the present embodiment and may be altered where this is appropriate.

INDUSTRIAL APPLICABILITY

When a liquid mixture which contains a plurality of types of liquid which each have mutually different vapor pressures is being sealed inside a first mounting component, it is possible to accurately and with superior reproducibility seal the desired quantities of each of the plurality of types of liquid and at the same time prevent air from being retained inside the first mounting component.

DESCRIPTION OF THE REFERENCE NUMERALS

10 Vibration isolator
11 First mounting component
12 Second mounting component
13 Rubber elastic body
14 Primary liquid chamber
15 Secondary liquid chamber
16 Partitioning component
17 Main body rubber component
21 Vibration isolator main body
24 Orifice passage
L Liquid mixture
L1 First liquid
L2 Second liquid

What is claimed is:

1. A method of manufacturing a vibration isolator which is provided with:
    a cylindrical first mounting component which is connected to either one of a vibration generating portion or a vibration receiving portion;
    a second mounting component which is connected to the other one of the vibration generating portion or the vibration receiving portion;
    a rubber elastic body which elastically connects together these two mounted components; and
    a partitioning component which partitions the interior of the first mounting component into a primary liquid chamber in which the rubber elastic body forms a portion of the partition wall thereof and whose internal volume is changed by the deformation of the rubber elastic body, and a secondary liquid chamber in which at least a portion of the partition wall thereof is formed such that it is able to be deformed, wherein
    an orifice passage which enables the primary liquid chamber to communicate with the secondary liquid chamber is formed between an outer circumferential surface side of the partitioning component and an inner circumferential surface side of the first mounting component, and a liquid mixture which contains at least a first liquid and a second liquid which each have mutually different vapor pressures is sealed inside the first mounting component, the method of manufacturing the vibration isolator comprising:
    a main body rubber component formation step in which a main body rubber component is created when the two mounting components are joined together by means of the rubber elastic body;
    a vibration isolator main body formation step in which a vibration isolator main body is formed by attaching at least the partitioning component to the main body rubber component such that the interior of the first mounting component is tightly sealed and is divided into the primary chamber and the secondary chamber; and
    a sealing step in which a vibration isolator is formed by sealing the liquid mixture inside the interior of the first mounting component in the vibration isolator main body, wherein,
    in the sealing step, after the internal pressure inside the first mounting component has been changed to a negative pressure which is equal to or greater than the vapor pressure of the first liquid which has the lower vapor pressure from among the first liquid and the second liquid, the first liquid is injected into the interior of the first mounting component so as to raise the internal pressure thereof, and, thereafter, the second liquid is injected into the interior of the first mounting component.

2. The method of manufacturing a vibration isolator according to claim 1, wherein,
    in the sealing step, the first liquid is injected into the interior of the first mounting component until the internal pressure inside the first mounting component becomes a negative pressure that is equal to or more than the vapor pressure of the second liquid.

3. The method of manufacturing a vibration isolator according to claim 1, wherein,
    in the sealing step, a greater quantity of the first liquid than of the second liquid is injected into the interior of the first mounting component.

4. The method of manufacturing a vibration isolator according to claim 3, wherein,
    in the sealing step, between not less than 60% by weight and not more than 99.9% by weight of the first liquid is injected into the first mounting component, and between not less than 0.1% by weight and not more than 40% by weight of the second liquid is injected into the first mounting component.

5. The method of manufacturing a vibration isolator according to claim 1, wherein
    the first liquid either contains ethylene glycol and propylene glycol, or is solely ethylene glycol, and the second liquid is silicone oil, fluorine oil, or water.

* * * * *